UNITED STATES PATENT OFFICE 2,166,362

STABLE CALCIUM HYPOCHLORITE COMPOSITION

James Douglas MacMahon, Niagara Falls, N. Y., assignor to The Mathieson Alkali Works, Inc., New York, N. Y., a corporation of Virginia No Drawing. Application November 15, 1937, Serial No. 174,659

10 Claims. (Cl. 23—250)

This invention relates to an improved calcium hypochlorite product which produces a clear solution when dissolved in water containing carbonate and bicarbonate ions.

In the use of solutions containing calcium ions and hypochlorite ions, it has been observed that when certain natural waters are used as solvents, a turbidity or very fine white granular suspension is gradually formed in the solution, although at the start the solution may have been clear. This presents a serious disadvantage to the use of calcium hypochlorite solutions, particularly when used as sterilizing solutions. The formation of this fine white suspension is particularly disadvantageous since the finely divided granular precipitate formed tends to adhere to surfaces exposed to the solution. For example, in the dairy industry, a particularly advantageous mixture used for sterilizing purposes consists of calcium hypochlorite of high purity admixed with a salt such as sodium chloride. When a product such as this is dissolved in certain natural waters, the formation of a finely divided precipitate which adheres to the surfaces of the equipment being sterilized is particularly objectionable. Generally speaking, solutions containing calcium ions and hypochlorite ions which are used for such purposes are initially clear when the hypochlorite used is of high quality and when it is used in an amount such that the concentration of available chlorine does not exceed about 300 parts per million. When higher concentrations are employed or when a hypochlorite product of lesser purity is used the initial solutions will often possess a certain degree of turbidity. In the first case where the solutions are initially clear the objectionable fine white precipitate slowly develops causing turbidity, and in cases where the solution is originally turbid, the turbidity is considerably increased when the referred to natural waters are employed.

The formation of this finely divided white precipitate is apparently caused by the presence of temporary hardness in the water used as the solvent. It appears that the bicarbonate ions present in the hard water, whether introduced in the form of calcium bicarbonate or magnesium bicarbonate or both are transformed into carbonate ions which cause a finely divided $CaCO_3$ to precipitate. The following equation indicates the probable course of such a reaction:

$$Ca(OH)_2 + Ca(HCO_3)_2 \rightarrow 2CaCO_3 + 2H_2O$$

Even though a calcium hypochlorite of relatively high purity is used, there is apparently sufficient hydroxyl ion concentration to cause the formation of this objectionable precipitate according to the above equation.

I have found that the above difficulties can be overcome by employing a mixture containing, in addition to the calcium hypochlorite product, a relatively small amount of tetra sodium pyrophosphate ($Na_4P_2O_7$) in intimate association therewith. I have also found that these difficulties can be overcome by employing a mixture containing, in addition to the calcium hypochlorite product, a relatively small amount of acid sodium pyrophosphate ($Na_2H_2P_2O_7$) in intimate association therewith. Both of these pyrophosphates are soluble in water. The solution resulting from dissolving such mixtures in water, even though the water may be high in temporary hardness, retains its original clarity for long periods of time, or if originally turbid does not increase in turbidity.

The calcium hypochlorite which I prefer to use as the primary constituent in the product of the present invention is one which is a stable product high in available chlorine and low in calcium chloride and calcium hydroxide. The calcium hypochlorite product the preparation of which is described in United States Letters Patent No. 1,787,048, granted to Robert B. MacMullin and Maurice C. Taylor on an application filed August 16, 1928, is particularly useful in the product of the present invention. In general, it is advantageous to use a calcium hypochlorite containing upwards of 50% available chlorine, or better upwards of 60% available chlorine, and not more than about 10% of calcium chloride and a minimum of free lime. The invention is, however, also useful when embodied in mixtures the primary constituent of which is conventional bleaching powder or chlorinated lime, since the admixed pyrophosphate does not impair the stability of such products as would sodium carbonate, for example. Bleaching powder or chlorinated lime is not, strictly, a calcium hypochlorite but it does form a solution in water containing calcium ions and hypochlorite ions.

I have found that the addition of either tetra sodium pyrophosphate or acid sodium pyrophosphate to calcium hypochlorite compounds of the type described in proportion as low as 1 part to 14,000 parts of the hypochlorite will effectively prevent turbidity in water solutions to which a quantity of the mixture sufficient to produce an available chlorine concentration below 300 parts per million has been added. In the preparation of the dry product of the present invention, however, I prefer to employ quantities of the soluble pyrophosphate not less than about 0.5 or 1 part per 100 parts of the hypochlorite. This is a practical expedient occasioned by the physical difficulties involved in properly mixing the dry salts when a lower proportion of the pyrophosphate is used. The fineness of division of the salts themselves as well as the efficiencies of the mixing devices are considerations in this problem. For highest efficiencies it is, therefore, recommended that quantities of pyrophosphate within the range 0.5–8 parts to 100 parts of the hypochlorite be used. I have found that mixtures containing proportions of tetra sodium pyrophosphate higher than about 6 parts to 100 parts of the hypochlorite have an increasing tendency to produce a heavy, well flocculated precipitate. I have also found that mixtures containing proportions of acid sodium pyrophosphate higher than about 3 parts to 100 parts of the hypochlorite have a similarly increasing tendency to produce a flocculated precipitate. In general, quantities of pyrophosphate between 1 and 3 parts per 100 parts of the hypochlorite produce maximum efficiencies when the mixture is later dissolved in water containing temporary hardness. With increasing efficiency of mixing, the lower limit moves down.

The mixture of this invention may also include inert diluent salts such as sodium chloride added to keep the available chlorine content of the total composite mixture within some desired maximum limit, a 10% available chlorine limit, for example. Such a mixture may comprise 13 parts of the hypochlorite, 86 parts of common salt and 1 part of the pyrophosphate, for example. The physical difficulties involved in proper mixing, above noted, may require the use of somewhat increased proportions of pyrophosphate in such mixtures unless the pyrophosphate is incorporated into the hypochlorite before the salt is added to the mixture. The addition of sodium chloride apparently tends to repress flocculation when acid sodium pyrophosphate is used.

I have further observed that the addition of sodium hexametaphosphate and sodium orthophosphate to calcium hypochlorite produces results of a similar nature, although to a lesser extent. Their use is less satisfactory on a commercial scale. Greatly increased quantities of the hexametaphosphate as compared to pyrophosphate are required to satisfactorily disperse the $CaCO_3$, thus producing a clear solution. Since pyrophosphate is more economical and normally occurs in more finely divided form, thus lending itself more readily to the intimate mixing of small quantities with the hypochlorite, I employ it in the product of my invention. The optimum effects of the addition of small quantities of ortho phosphate do not compare favorably with the results obtained with pyrophosphate, and the use of amounts over 2 parts per 100 parts hypochlorite results in the rapid production of large white flocs.

I am unable to give a complete explanation of the manner in which the improved product of my invention operates when placed in solution, either to prevent precipitation or to so completely disperse the $CaCO_3$ that the resulting solution appears to be clear. It will be noted that the quantity of pyrophosphate used is but a small fractional part of the stoichiometrical equivalent of the calcium ion present, so that the possibility of any stoichiometrical reaction with the calcium ion such as, for example, the formation of soluble compounds containing a complex ion of calcium and pyrophosphate would appear to be eliminated. As a hypothesis I suggest that the results obtained may be due to a peptizing effect caused by an ion of pyrophosphate associating itself with a calcium carbonate particle of colloidal dimensions. It is to be understood, however, that my invention is not in any way predicated on such a theory of the mechanism of the reaction occurring in the solution which results from dissolving the hereindescribed product in water containing temporary hardness.

Improved calcium hypochlorite compositions containing water soluble pyrophosphates and sodium carbonate, which when dissolved in water produce aqueous solutions which contain hypochlorite ions and in which the precipitated calcium carbonate is maintained in a high degree of dispersion, are described and claimed in my copending application Serial No. 174,660, filed November 15, 1937.

I claim:

1. An improved product for forming aqueous solutions containing calcium ions and hypochlorite ions, comprising a calcium hypochlorite and, in intimate association therewith, tetra sodium pyrophosphate in proportion approximating 0.5%–8% by weight on the calcium hypochlorite.

2. An improved product for forming aqueous solutions containing calcium ions and hypochlorite ions, comprising a calcium hypochlorite and, in intimate association therewith, tetra sodium pyrophosphate in proportion approximating 0.5%–8% by weight on the calcium hypochlorite, and an inert diluent salt.

3. An improved product for forming aqueous solutions containing calcium ions and hypochlorite ions, comprising a calcium hypochlorite containing upwards of 50% available chlorine and, in intimate association therewith, tetra sodium pyrophosphate in proportion approximating 0.5%–8% by weight on the calcium hypochlorite.

4. An improved product for forming aqueous solutions containing calcium ions and hypochlorite ions, comprising a calcium hypochlorite and, in intimate association therewith, acid sodium pyrophosphate in proportion approximating 0.5%–8% by weight on the calcium hypochlorite.

5. An improved product for forming aqueous solutions containing calcium ions and hypochlorite ions, comprising a calcium hypochlorite and, in intimate association therewith, acid sodium pyrophosphate in proportion approximating 0.5%–8% by weight on the calcium hypochlorite, and an inert diluent salt.

6. An improved product for forming aqueous solutions containing calcium ions and hypochlorite ions, comprising a calcium hypochlorite containing upwards of 50% available chlorine and, in intimate association therewith, acid sodium pyrophosphate in proportion approximating 0.5%–8% by weight on the calcium hypochlorite.

7. An improved product for forming aqueous solutions containing calcium ions and hypochlorite ions, comprising a chlorinated lime and, in intimate association therewith, tetra sodium pyrophosphate in proportion approximating 0.5%–8% by weight on the chlorinated lime.

8. An improved product for forming aqueous solutions containing calcium ions and hypochlorite ions, comprising a calcium hypochlorite and, in intimate association therewith, a water soluble pyrophosphate in proportion approximating 1%–3% by weight on the calcium hypochlorite.

9. An improved product for forming aqueous solutions containing calcium ions and hypochlorite ions, comprising a calcium hypochlorite and, in intimate association therewith, a water soluble pyrophosphate in proportion approximating 0.5%–8% by weight on the calcium hypochlorite.

10. An improved product for forming aqueous solutions containing calcium ions and hypochlorite ions, comprising a calcium hypochlorite and, in intimate association therewith, a water soluble pyrophosphate in proportion approximating 0.5%–8% by weight on the calcium hypochlorite, and an inert diluent salt.

JAMES DOUGLAS MacMAHON.